(12) United States Patent
Hebbale et al.

(10) Patent No.: US 6,398,690 B1
(45) Date of Patent: Jun. 4, 2002

(54) FIVE SPEED POWER TRANSMISSION WITH TWO SIMPLE PLANETARY GEAR SETS

(75) Inventors: Kumaraswamy V. Hebbale, Troy; Sekhar Raghavan, deceased, late of Troy, by Amrita Sekhar, legal representative; Patrick Benedict Usoro, Troy, all of MI (US)

(73) Assignee: General Motors Corporation, Detroit, MI (US)

( * ) Notice: Subject to any disclaimer, the term of this patent is extended or adjusted under 35 U.S.C. 154(b) by 36 days.

(21) Appl. No.: 09/702,915

(22) Filed: Oct. 30, 2000

(51) Int. Cl.[7] ............................................... F16H 3/44
(52) U.S. Cl. ..................................... 475/314; 475/284
(58) Field of Search ................................ 475/311, 314, 475/315, 316, 271, 284, 288

(56) References Cited

U.S. PATENT DOCUMENTS

| | | | | |
|---|---|---|---|---|
| 4,602,525 A | * | 7/1986 | Moroto et al. | 475/284 X |
| 5,106,352 A | * | 4/1992 | Lepelletier | 475/284 X |
| 5,122,103 A | * | 6/1992 | Nakawaki et al. | 475/284 X |
| 5,267,916 A | * | 12/1993 | Beim et al. | 475/285 |
| 5,997,429 A | * | 12/1999 | Raghavan et al. | 475/311 X |
| 6,146,305 A | * | 11/2000 | Habbale et al. | 475/284 |
| 6,193,626 B1 | * | 2/2001 | Hebbale et al. | 475/284 |
| 6,302,821 B1 | * | 10/2001 | Lee | 475/284 |

FOREIGN PATENT DOCUMENTS

| | | | | |
|---|---|---|---|---|
| JP | 1-234640 | * | 9/1989 | 475/284 |
| JP | 2-245548 | * | 10/1990 | 475/271 |
| JP | 4-19449 | * | 1/1992 | 475/284 |

* cited by examiner

*Primary Examiner*—Charles A. Marmor
*Assistant Examiner*—Roger Pang
(74) *Attorney, Agent, or Firm*—Jeffrey A. Sedlar; George A. Grove

(57) ABSTRACT

A powertrain has an engine, torque converter, and planetary transmission that includes an input shaft, an output shaft, two simple planetary gear sets, rive rotating torque transmitting mechanisms (clutches) and one stationary torque transmitting mechanism (brake). The planetary gear sets are interconnected with both a permanent interconnection and a selective interconnection. A first member of a first of the planetary gear sets is continuously connected with the output shaft and a first member of the second planetary gear set is continuously connected with a stationary portion of the transmission. Two of the clutches are operable to selectively connect the input shaft with the second and third members of the first planetary gear set, respectively. A third of the clutches is connectable between the second member of the second planetary gear set and the output shaft. The brake is selectively connectable between the second member of the first planetary gear set and the stationary portion. The third members of the planetary gear sets are continuously interconnected for common rotation. The second members of the planetary gear sets are selectively interconnectable by a fourth of the clutches. The second and third members of the second planetary gear set are selectively interconnectable by a fifth of the clutches. The clutches and brakes are selectively engaged in pairs to provide five forward drive ratios and one reverse ratio and interchanged to provide single transition shifts between the lowest four of the forward drive ratios and a double transition shift between the highest two of the forward ratios.

3 Claims, 1 Drawing Sheet

| GEAR | RATIO | C1 26 | C2 28 | C3 30 | C4 32 | C5 34 | C6 36 |
|---|---|---|---|---|---|---|---|
| REVERSE | 2.20 | X | | | | | G |
| NEUTRAL | – | O | | | | | |
| FIRST | 2.88 | X | | G | | | |
| SECOND | 1.59 | | X | X | | | |
| THIRD | 1.00 | X | X | | | | |
| FOURTH | 0.69 | | X | | X | | |
| FIFTH | 0.54 | X | | | | X | |

X: Applied, G: Applied (Grarage Shift), O: Applied with No Load
R1/S1=2.20   R2/S2 = 1.70

FIVE SPEED POWER TRANSMISSION WITH TWO SIMPLE PLANETARY GEAR SETS

TECHNICAL FIELD

This invention relates to multi-speed transmissions and, more particularly, to five speed transmissions having two simple planetary gear sets.

BACKGROUND OF THE INVENTION

Automotive vehicles have a powertrain that generally includes an engine, a starting device, and a power transmission. The transmission is, in most vehicles, a multi-speed unit that utilizes either a planetary gear arrangement or a countershaft gearing mechanism. More recently, some manufacturers have produced variable type units. However, the most popular of these transmissions appears to be the automatic shifting, multi-speed planetary gearing mechanisms.

The planetary type transmissions have evolved from two speed units to four and five speed units in passenger vehicles. Some heavy trucks have employed six or more speed ratios. However, these truck units are not adaptable to passenger vehicles. The four and five speed transmissions permit better use of the engine operating range by allowing the performance to remain within the maximum torque range during vehicle acceleration and at the best fuel consumption rate during cruising speeds.

SUMMARY OF THE INVENTION

It is an object of the present invention to provide an improved multi-speed power transmission.

In one aspect of the present invention, two simple planetary gear sets are controlled to provide five forward speed ratios and one reverse ratio. In another aspect of the present invention, the planetary gear sets are controlled by six torque transmitting mechanisms.

In yet another aspect of the present invention, one of the planetary gear members is continually connected with a stationary member of the transmission. In still another aspect of the present invention, the transmission has a low mechanical content including the gearing and torque transmitting mechanisms. In a further aspect of the present invention, the six torque transmitting mechanisms include five rotating torque transmitting mechanisms (clutches) and one stationary torque transmitting mechanism (brake). In a yet further aspect of the present invention, two of the rotating torque transmitting mechanisms provide input connections, two of the rotating torque transmitting mechanisms provide interconnections, and one of the rotating torque transmitting mechanisms provides an output connection for the planetary gear sets.

DESCRIPTION OF AN EXEMPLARY EMBODIMENT

Figures 1, 2:
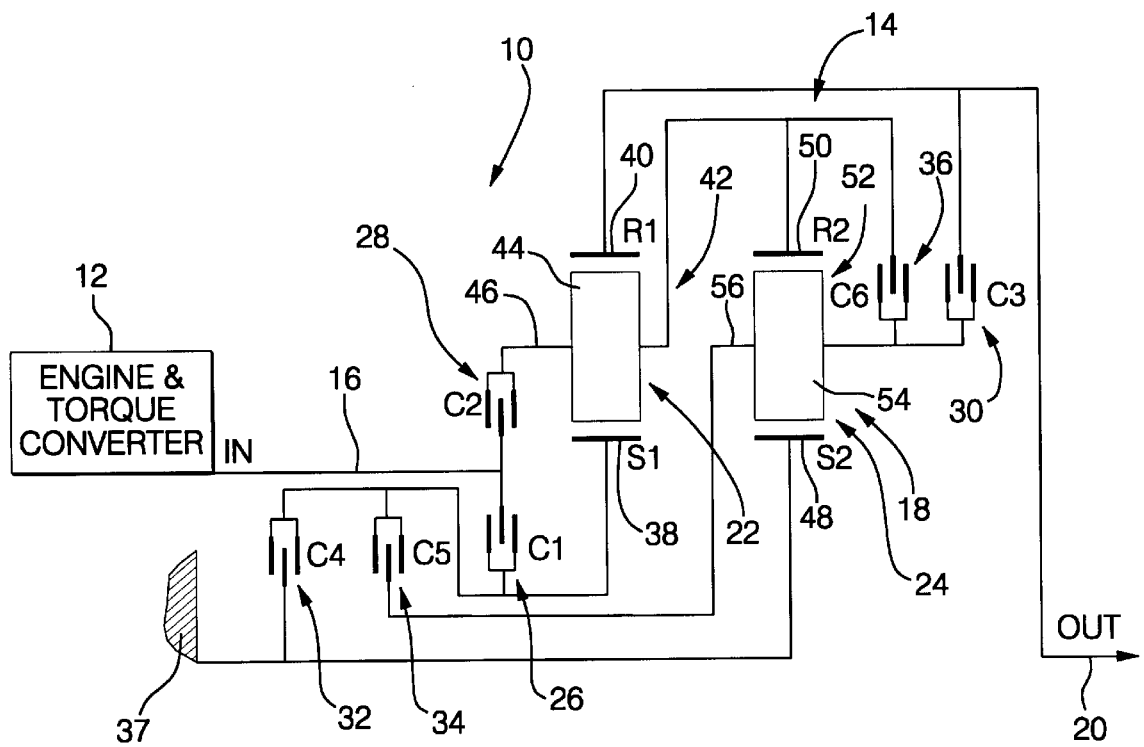
FIG. 1 is a schematic diagram of a powertrain having a transmission incorporating the present invention.
FIG. 2 is a truth table describing the ratio interchange sequence for the transmission in FIG. 1.

A powertrain 10, shown in FIG. 1, includes a conventional engine and torque converter 12 and a multi-speed transmission 14. The transmission has an input shaft 16, continuously connected with the torque converter, a planetary gear arrangement 18, and an output shaft 20. The planetary gear arrangement 18 includes a pair of simple planetary gear sets 22 and 24, five conventional fluid-operated, selectively-engageable, rotating torque transmitting mechanisms (clutches) 26, 28, 30, 34 and 36, and one conventional fluid-operated, selectively-engageable, stationary torque transmitting mechanism (brake) 32. The torque transmitting mechanisms 26 and 28 are connected with the input shaft 16, the torque transmitting mechanism 30 is connected with the output shaft 20, and the torque transmitting mechanism 32 is connected with a conventional transmission housing 37 which also rotatably supports the input shaft 16 and the output shaft 20.

The planetary gear set 22 has a sun gear member 38, a ring gear member 40, and a planet carrier assembly member 42 that includes a plurality of pinion gears 44 rotatably mounted on a carrier 46 and disposed in meshing relation with both the sun gear member 38 and the ring gear member 40. The planetary gear set 24 has a sun gear member 48, a ring gear member 50, and. a planet carrier assembly member 52 that includes a plurality of pinion gears 54 rotatably mounted on a carrier 56 and disposed in meshing relation with both the sun gear member 48 and the ring gear member 50. The ring gear member 40 is continuously connected with the output shaft 20. The sun gear member 38 is operatively connected with the torque transmitting mechanisms 26, 34, and 32. The planet carrier assembly member 42 is continuously connected with the ring gear member 50 and operatively with both of the torque transmitting mechanisms 28 and 36. The sun gear member 48 is continuously connected with the transmission housing 37. The planet carrier assembly member 52 is operatively connected with the torque transmitting mechanisms 30, 36, and 34.

The torque transmitting mechanisms 26, 28, 30, 32, 34, and 36 are preferably controlled by an electro-hydraulic control system that employs an electronic control unit (ECU), not shown, which includes a programmable digital computer. As is well known, the ECU receives operating condition signals, such as input speed, torque, output speed, etc., from sensors in the powertrain 10 and issues commands to planetary gear arrangement 14 in the!form of hydraulic pressure signals to enforce the engagement and disengagement of the torque transmitting mechanisms and, therefore, the interchange of gear ratios.

When the torque transmitting mechanism 26 is engaged, the sun gear member 38 is drivingly connected with the engine and torque converter 12 through the input shaft 16. When the torque transmitting mechanism 28 is engaged, the planet carrier assembly member 42 and the ring gear member 50 are drivingly connected with the engine and torque converter 12 through the input shaft 16. When the torque transmitting mechanism 30 is engaged, the planet carrier assembly member 52 is drivingly connected with the output shaft 20. When the torque transmitting mechanism 32 is engaged, the sun gear member 38 is connected with the transmission housing 37. The torque transmitting mechanisms 34 and 36 are interconnecting mechanisms, that is, they connect two planetary gear members together. When the torque transmitting mechanism 34 is engaged, the sun gear member 38 and the planet carrier assembly member 52 are interconnected for common rotation. When the torque transmitting mechanism 36 is engaged, the ring gear member 50 and planet carrier assembly member 52 are interconnected, which will cause the planetary gear set 24 and the planet carrier assembly member 42 to be held stationary due to the connection of the sun gear member 48 with the transmission housing 37.

The torque transmitting mechanisms 26, 28, 30, 32, 34 and 36 are selectively engaged in combinations of two to establish five forward drive ratios and a reverse drive ratio between the input shaft 16 and the output shaft 20. A neutral condition is also attainable when only the torque transmitting mechanism 26 is engaged or none of the torque transmitting mechanisms are engaged. As will be evident from the following description, the torque transmitting mechanism 26 will remain engaged during a forward/reverse interchange. To establish the reverse drive ratio, the torque transmitting mechanisms 26 and 36 are engaged. This will establish the sun gear member 38 as an input member and the planet carrier assembly member 42 as a reaction member, resulting in reverse rotation of the ring gear member 40 and: the output shaft 20. The reverse ratio is determined by the ratio of the planetary gear set 22.

To establish the first forward ratio, the torque transmitting mechanisms 26 and 30 are engaged. This will establish the sun gear member 38 as an input member and the sun gear member 48 as a reaction member. The planetary gear sets 22 and 24 are interconnected by the torque transmitting mechanism 30 resulting in a forward rotation of the ring gear member 40, planet carrier assembly member 52 and the output shaft 20 at a reduced speed relative to the input shaft 16. The first forward ratio is determined by the tooth ratios of both of the planetary gear sets 22 and 24. It should be noted that during a reverse to first interchange or a first to reverse interchange, only the torque transmitting mechanisms 30 and 36 need to be swapped.

The second forward drive ratio is established by the interchange of the torque transmitting mechanisms 26 and 28 while the torque transmitting mechanism 30 remains engaged. This is a single transition shift interchange. The ring gear member 50 becomes an input member and the sun gear member 48 remains a reaction member. The planet carrier assembly member 52 and the output shaft 20 are driven forwardly at a reduced speed relative to the input shaft 16. The second forward drive ratio is determined by the. tooth ratio of the planetary gear set 24.

The third forward drive ratio is established by the interchange of the torque transmitting mechanisms 30 and 26 while the torque transmitting mechanism 28 remains engaged. This is a single transition shift interchange. With the engagement of both of the torque transmitting mechanisms 26 and 28, the planetary gear set 22 will rotate as a unit, resulting in a direct drive between the input shaft 16 and the output shaft 20.

The fourth forward drive ratio is established by the interchange of the torque transmitting mechanisms 26 and 32 while the torque transmitting mechanism 28 remains engaged. This is a single transition shift interchange. The torque transmitting mechanism 32 will result in the sun gear member 38 becoming a reaction member while the planet carrier assembly member 42 is an input member. The ring gear member 40 will be overdriven forwardly relative to the input shaft 16. The fourth forward drive ratio is determined by the tooth ratio of the planetary gear set 22.

To establish the fifth forward ratio, the torque transmitting mechanisms 28 and 32 are disengaged while the torque transmitting mechanisms 26 and 34 are substantially simultaneously engaged. This is a double transition shift. The sun gear member 38 and planet carrier assembly member 52 will be driven forwardly at the speed of the input shaft 16, and the sun gear member 48 will be stationary. This will result in the ring gear member 50 and the planet carrier assembly member 42 being overdriven in the forward direction, relative to the input shaft 16, at a ratio determined by the planetary gear set 24. The fifth forward drive ratio is determined by the tooth ratios of both of the planetary gear sets 22 and 24.

The torque transmitting mechanism interchanges described represent an upshift pattern. A downshift pattern will be the reverse of these interchanges. For example, a third to second interchange is accomplished with the interchange of the torque transmitting mechanisms 26 and 30 while the torque transmitting mechanism 28 remains engaged. It will be appreciated by those skilled in the art that a second to fourth and fourth to second skip shift is also possible with a single transition interchange. The torque transmitting mechanism 28 will remain engaged during this interchange while the torque transmitting mechanisms 30 and 32 are swapped. The upshift and downshift sequence can be readily determined from the truth table of FIG. 2. The truth table in FIG. 2 also provides an example of the ratios that are available with the present invention. The ratios of the example are determined using a tooth ratio of ring gear member 40 to sun gear member 38 (R1/S1) equal to 2.20 and a tooth ratio of ring gear member 50 to sun gear member 48 (R2/S2) equal to 1.70.

The double transition shift interchange that occurs between the fourth and fifth forward drive ratios has a step of 1.27 which aids in making the shift interchange acceptable. The overall forward drive ratio coverage ($1^{st}/5^{th}$), in the given example, is 5.33 and the reverse to first ratio is 0.76. A transmission using these numerical relations will perform very well with a conventional engine. If other tooth ratios are employed, the ratios will, of course, be different and the steps between ratios may be different.

What is claimed is:

1. A power transmission comprising:

a transmission housing;

an input shaft rotatably supported in said housing;

an output shaft rotatably supported in said housing;

a first simple planetary gear set having a first sun gear member, a first ring gear member, and a first planet carrier assembly member, said ring gear member being continuously connected with said output shaft;

a second simple planetary gear set having a second sun gear, a second ring gear, and a second planet carrier assembly member, said second ring gear member being continuously connected with said first planet carrier assembly member, and said second sun gear member being continuously connected with said transmission housing;

a first selectively engageable clutch operatively connected between said input shaft and said first sun gear member;

a second selectively engageable clutch operatively connected between said input shaft and said first planet carrier assembly member and said second ring gear member;

a third selectively engageable clutch operatively connected between said first sun gear member and said second planet carrier assembly member;

a fourth selectively engageable clutch operatively connected between said second planet carrier assembly member and said output shaft;

a fifth selectively engageable clutch operatively connected between two members of said second simple planetary gear set;

a first selectively engageable brake operatively connected between said first sun gear member and said transmission housing; and said five clutches and first brake being operatively engaged in combinations of two to establish five forward drive ratios and one reverse drive ratio between said input shaft and said output shaft.

2. The power transmission defined in claim 1 wherein:

said first clutch being selectively engaged to establish said reverse drive ratio and a first, third and fifth of said forward drive ratios;

said second clutch being selectively engaged to establish three consecutive ratios of said forward ratios; and said first, second, third, and fourth clutches and said first brake being selectively interchanged to provide a shift sequence wherein a first through fourth of said forward drive ratios are accomplished with single transition shift interchanges and a fourth to fifth ratio interchange is accomplished with a double transition shift interchange.

3. A power transmission comprising:

input means for providing power to said transmission;

output means for delivering power from said transmission;

a planetary gear arrangement operatively connected between said input means and said output means and comprising first and second simple planetary gear sets, five rotating torque transmitting mechanisms and one stationary torque transmitting mechanism;

said first and second simple planetary gear sets each having first second and third members, said third member of said first planetary being continuously connected with said output means for common rotation therewith, said second members of said planetary gear sets being continuously interconnected for common rotation and being selectively connectable with said input means through a first of said rotating torque transmitting mechanisms, said first member of said first planetary gear set being operatively connectable with said input means through a second of said rotating torque transmitting mechanisms, with said third member of said second planetary gear set through a third of said rotating torque transmitting mechanisms and with a stationary portion of said transmission through said stationary torque transmitting mechanism, said first member of said second planetary gear set being continuously connected with said stationary portion of said transmission, said third member of said second planetary gear set being selectively connectable with said output means through a fourth of said rotating torque transmitting mechanisms and with said second member of said second planetary gear set through a fifth of said rotating torque transmitting mechanisms; and said five rotating torque transmitting mechanisms and one stationary torque transmitting mechanism being selectively engaged in combinations of two to provide five forward drive ratios and one reverse drive ratio between said input means and said output means.

\* \* \* \* \*